(12) United States Patent
Watanabe et al.

(10) Patent No.: US 7,474,427 B2
(45) Date of Patent: Jan. 6, 2009

(54) IMAGE FORMING SYSTEM AND IMAGE FORMING METHOD

(75) Inventors: Ryoji Watanabe, Kanagawa (JP);
  Akihiko Takada, Kanagawa (JP);
  Masayoshi Sakakibara, Kanagawa (JP);
  Hajime Kishimoto, Kanagawa (JP);
  Yasuo Horino, Tokyo (JP); Toshiyuki Yano, Kanagawa (JP); Yasuhiro Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1212 days.

(21) Appl. No.: 10/647,452

(22) Filed: Aug. 26, 2003

(65) Prior Publication Data
  US 2004/0041821 A1   Mar. 4, 2004

(30) Foreign Application Priority Data
  Aug. 28, 2002  (JP)  ............................. 2002-248783

(51) Int. Cl.
  *G06F 3/12*  (2006.01)
  *G06K 15/00*  (2006.01)
(52) U.S. Cl. ..................... 358/1.15; 358/1.13; 358/1.16
(58) Field of Classification Search ................ 358/1.16,
  358/1.17, 1.18, 1.15, 1.14, 1.13, 1.12, 1.9,
  358/1.2, 1.6, 1.5, 1.1, 1.11, 404, 405, 407,
  358/444, 468, 400, 401, 403; 710/1, 21,
  710/22, 33, 52, 74; 347/2, 3, 5, 14, 23; 399/1,
  399/8; 345/619; 715/200, 273, 274
  See application file for complete search history.

(56) References Cited
U.S. PATENT DOCUMENTS
5,856,662 A * 1/1999 Kohama et al. ............. 235/492

FOREIGN PATENT DOCUMENTS
| JP | A-11-187247 | 7/1999 |
| JP | A 2000-285203 | 10/2000 |
| JP | A 2001-134672 | 5/2001 |
| JP | A 2001-148000 | 5/2001 |
| JP | A 2001-229199 | 8/2001 |
| JP | A 2001-260580 | 9/2001 |
| JP | A 2001-283011 | 10/2001 |
| JP | A-2002-190911 | 7/2002 |

* cited by examiner

*Primary Examiner*—Dov Popovici
(74) *Attorney, Agent, or Firm*—Oliff & Berridge, PLC

(57) ABSTRACT

An UI section accepts operation of a user. A setting selection section judges as to whether this user operation instructs a process operation executed in accordance with setting information of an IC chip attached to an original document, or another process operation executed in accordance with setting information entered by the user. In the former case, an operation control section controls a data reading section so as to read out the setting information from the IC chip attached to the original document, and also, controls a print control section to perform printing/FAX transforming operations in accordance with this read setting information. In the latter case, an operation control section controls a data writing section in order to write the setting information entered by the user into the IC chip.

16 Claims, 8 Drawing Sheets

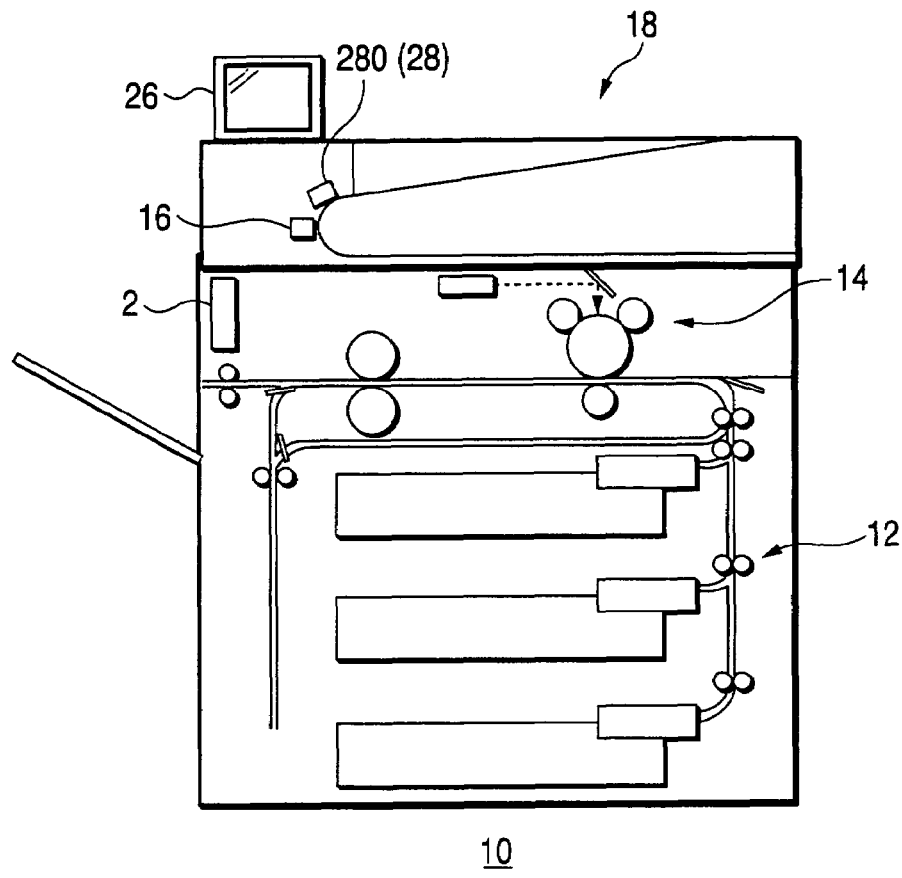

FIG. 7

TECHNICAL INFORMATION (CONFIDENTIAL)

NEW TECHNOLOGY EMPLOYED
IN NEW PRODUCT IS GIVEN AS FOLLOWS

1. CPU PORTION

2. MEMORY PORTION

3. SOFT WARE

42

IMAGE FORMING SYSTEM AND IMAGE FORMING METHOD

The present disclosure relates to the subject matter contained in Japanese Patent Application No.2002-248783 filed on Aug. 28, 2002, which is incorporated herein by reference in its entirety.

BACKGROUND OF THE INVENTION

1. Field of the Invention

The present invention is related to an image forming system and an image forming method, which can protect secret information using a non-contact memory attached to an original document.

2. Description of the Related Art

A compact semiconductor chip (for example, μ-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

SUMMARY OF THE INVENTION

The invention has been made from the viewpoint of the above-explained technical background. The invention has an object to provide an image forming system and an image forming method, by which setting information of image forming operation can be stored in an original document by utilizing a semiconductor chip from which data stored therein can be read out in a non-contact manner.

Also, another object of the present invention is to provide an image forming system and an image forming method, capable of forming an image by utilizing setting information of the image forming operation stored in the original document, as explained above.

[Image Forming System]

To achieve the above-described objects, an image forming system according to a first aspect of the invention, includes an image display member on which an image is displayed and an image forming apparatus. The image display member includes an information storage section for storing information, which is written from external thereinto, and supplying the stored information to the external. The image forming apparatus include a setting reception section for receiving a setting input from the external, an image reading section for reading the displayed image, an image forming section for forming the read image in accordance with the received setting, and an information writing section for writing setting information indicating the received setting into the information storage section.

Preferably, the information storage section supplies the written setting information to the external. The image forming apparatus further includes an information reading section for reading the supplied setting information. When the setting information is read, the image forming section forms the read image in accordance with the read setting information.

[Image Forming Apparatus]

According to a second aspect of the invention, an image forming apparatus forms an image displayed on an image display member, which stores information written from an external thereinto and supplies the stored information to the external. The image forming apparatus includes a setting reception section for receiving a setting input from the external, an image reading section for reading the displayed image, an image forming section for forming the read image in accordance with the received setting, and an information writing section for writing setting information indicating the received setting into the information storage section.

Preferably, the image display member supplies the written setting information to the external. The image forming apparatus further includes an information reading section for reading the supplied setting information. When the setting information is read, the image forming section forms the read image in accordance with the read setting information.

[Image Forming Method]

Also, according to a third aspect of the invention, an image forming method forms an imaged is played on an image display member, which stores information written from an external thereinto and supplies the stored information to the external. The image forming method includes receiving a setting input from the external, reading the displayed image, forming the read image in accordance with the received setting, and writing setting information indicating the received setting into the image display member.

Preferably, the image display member supplies the written setting information to the external. The image forming method further includes reading the supplied setting information. When the setting information is read, the read image is formed in accordance with the read setting information in the image forming step.

[Program]

According to a fourth aspect of the invention, a program makes a computer form an image display on an image display member, which stores information written from external thereinto and supplies the written information to the external. The program making the computer of an image forming apparatus perform a process including receiving a setting input from the external, reading the displayed image, forming the read image in accordance with the received setting, and writing setting information indicating the received setting into the image display member.

Preferably, the image display member supplies the written setting information to the external. The process further includes reading the supplied setting information. When the setting information is read, the read image is formed in accordance with the read setting information in the image forming step.

BRIEF DESCRIPTION OF THE DRAWINGS

FIG. 2 is a diagram for exemplifying a hardware construction of an apparatus main body indicated in FIG. 1.

FIG. 3 is a diagram for exemplifying an original paper indicated in FIG. 1 and FIG. 2.

FIG. 7 is a diagram for exemplifying an image printed on a printing paper by the first printing/transmitting program.

DETAILED DESCRIPTION OF THE PREFERRED EMBODIMENTS

Now, a description is made of embodiments of the invention.

[Composite Copying Machine 1]

Figure 1:
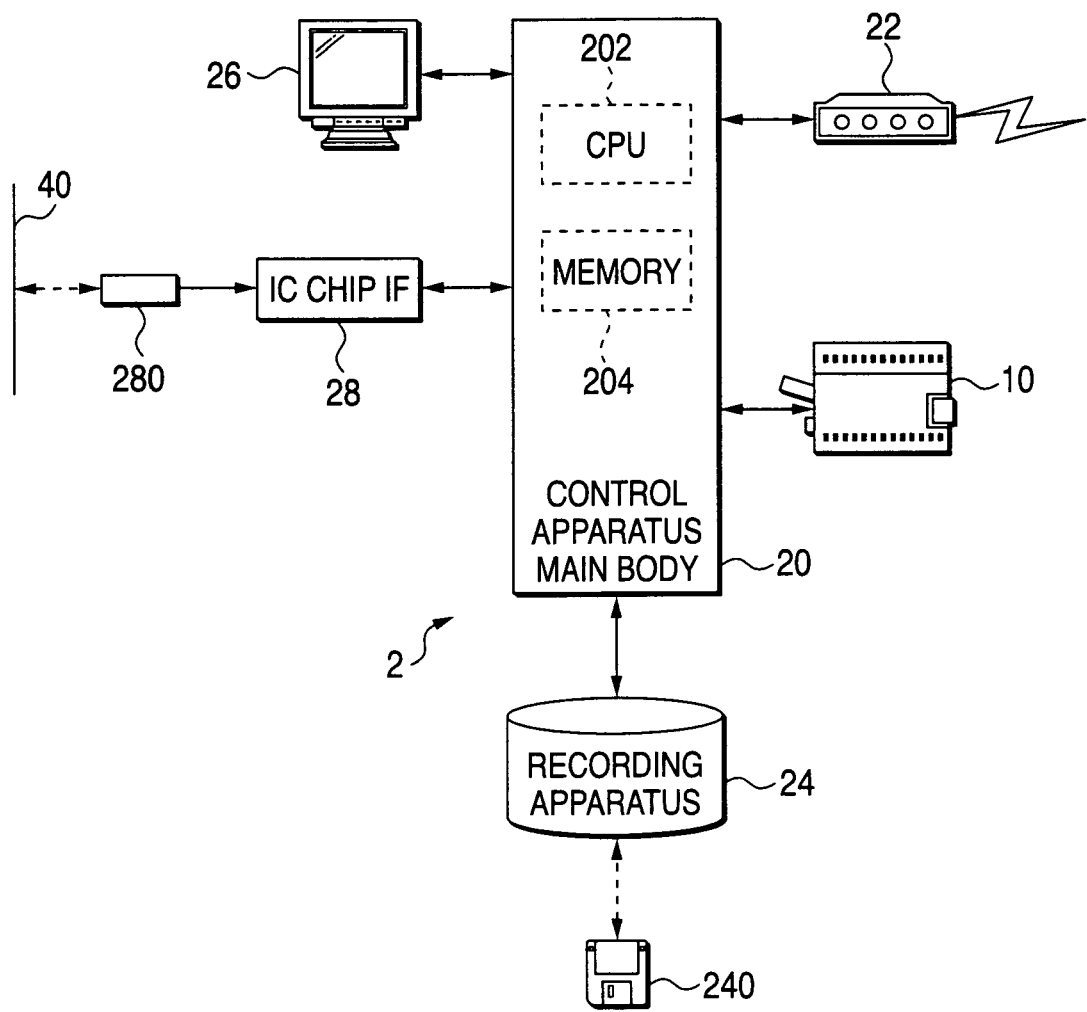
FIG. 1 is a diagram for representing a hardware structure of a composite copying machine to which an image forming method according to the present invention is applied, i.e., for mainly exemplifying a control apparatus thereof.

FIG. 1 is a diagram for exemplifying a hardware structure of a composite copying machine 1 to which an image forming method according to the present invention is applied. A control apparatus 2 of this composite copying machine 1 is mainly illustrated in FIG. 1.

As represented in FIG. 1, the composite copying machine 1 includes the control apparatus 2 and an apparatus main body 10.

The control apparatus 2 includes a control apparatus main body 20, a communication apparatus 22, a recording apparatus 24 such as an HDD/CD apparatus, a user interface apparatus (UI apparatus) 26, and an IC chip interface (IC chip IF) 28. The control apparatus main body 20 contains a CPU 202, a memory 204, and the like. The user interface apparatus 26 contains either an LCD display apparatus or a CRT display apparatus, and a keyboard/touch panel, and so on. The IC chip interface 28 contains an antenna 280.

[Apparatus Main Body 10]

FIG. 2 is a diagram for showing an example of a hardware structure of the apparatus main body 10 indicated in FIG. 1.

As indicated in FIG. 2, the apparatus main body 10 includes a paper tray section 12, a print engine 14, a scanner 16, an original feeding apparatus 18, and the like. The print engine 14 copies and/or prints images on printing papers 42 (see FIG. 7), which are fed from the paper tray section 12 by way of the xerography technique. It should be understood that both copying operation and printing operation will be referred to as "printing operation" hereinafter. The scanner 16 reads out images of an original paper 40. The original feeding apparatus 18 feeds the original paper 40.

Also, in the apparatus main body 10, both the IC chip IF 28 and the antenna 280 are arranged in the vicinity of an original feeding path of the original feeding apparatus 18, through which the original paper 40 is transported. Also, the UI apparatus 26 is arranged at an upper portion of the apparatus main body 10.

In other words, the composite copying machine 1 may be realized by employing such a hardware structure that both the IC chip IF 28 and the antenna 280 are added to a general-purpose composite copying machine having a function reading an image of the original paper 40 fed from the original feeding apparatus 18 and printing the image, and another function transmitting this image in a FAX (facsimile) mode.

It should be noted that as shown in FIG. 2, the control apparatus 2 (see FIG. 1) is actually stored inside the apparatus main body 10.

[Original Paper 40]

FIG. 3 is a diagram for illustratively showing an example of the original paper 40 shown in FIG. 1 and FIG. 2.

As indicated in FIG. 3, an image such as a text and a picture is indicated on the original paper 40. Also, a first IC chip 3 is applied to this original paper 40 by way of either a pasting method or an embedding method.

[IC Chip 3/IC Chip IF 28]

Figure 4:
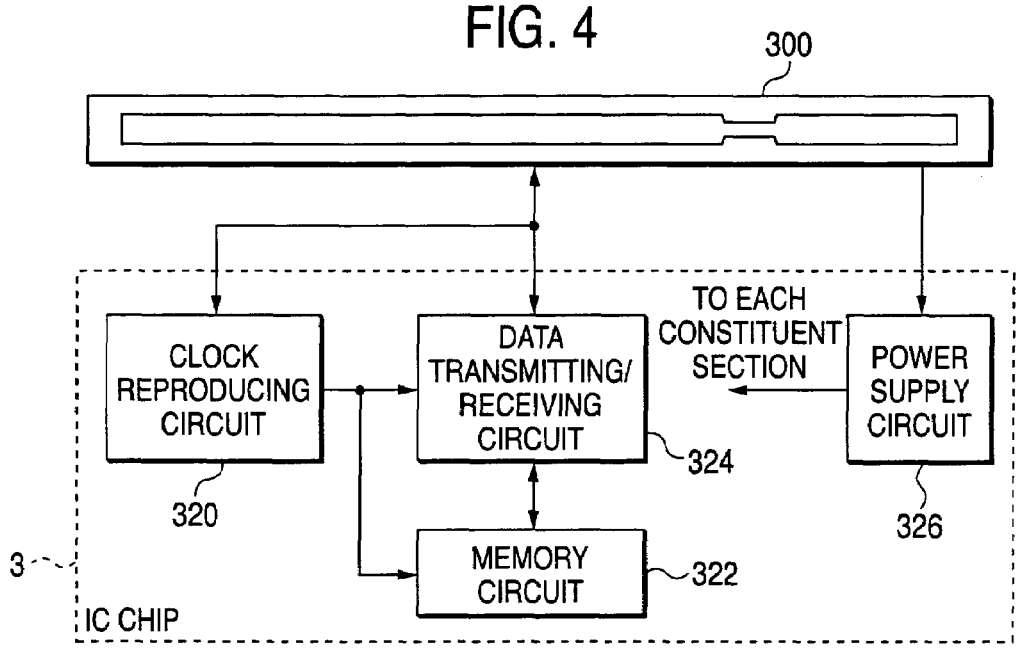
FIG. 4 is a diagram for showing a structure of a first IC chip indicated in FIG. 3.

FIG. 4 is a diagram for schematically showing a structure of the first IC chip 3 shown in FIG. 3.

Figure 5:
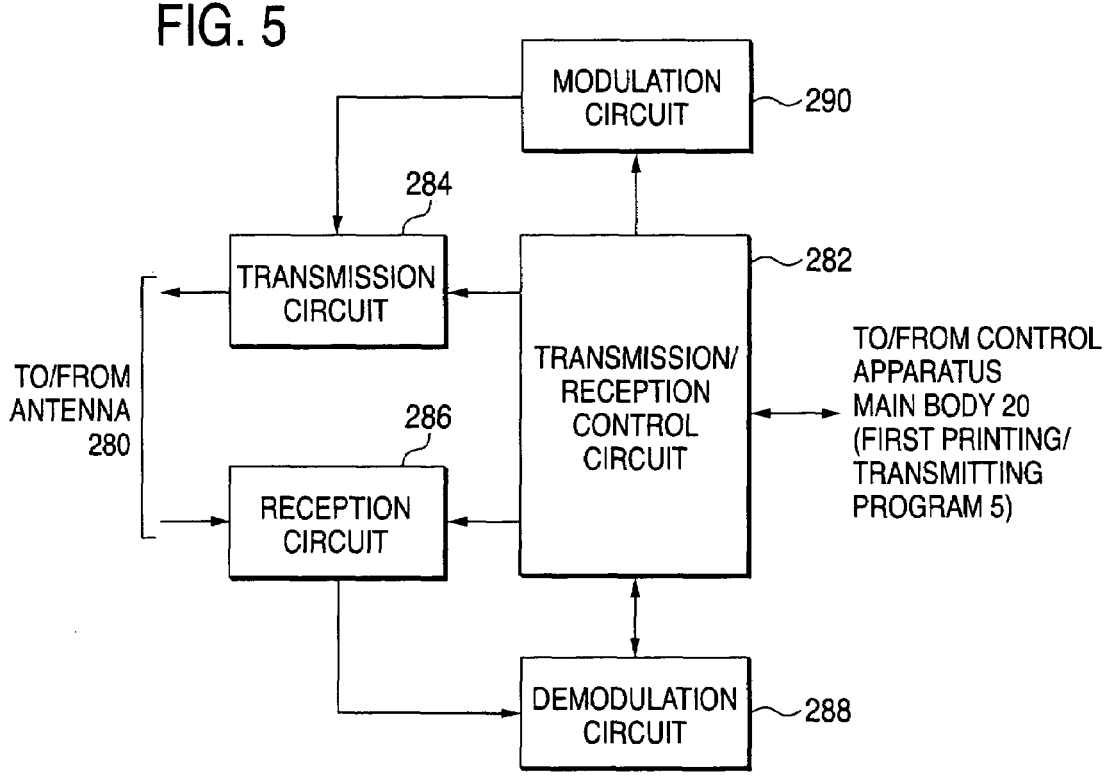
FIG. 5 is a diagram for indicating a structure of an IC chip IF shown in FIG. 1 and FIG. 2.

FIG. 5 is a diagram for schematically indicating a construction of the IC chip IF 28 shown in FIG. 1 and FIG. 2.

As shown in FIG. 4, the IC chip 3 includes an antenna 300, a clock reproducing circuit 320, a memory circuit 322, a data transmitting/receiving circuit 324, and a power supply circuit 326.

It should also be noted that when it is so guaranteed that the IC chip 3 of the original paper 40 passes through an area in close proximity to the antenna 280, an IC chip 3 having no antenna 300 may be employed.

Also, as shown in FIG. 5, the IC chip IF 28 includes a transmission circuit 284, a reception circuit 286, a transmission/reception control circuit 282, a demodulation circuit 288, and a modulation circuit 290.

In accordance with the below-mentioned operations of the respective constituent units employed in the IC chip 3 and the IC chip IF 28, information (data) may be written into the IC chip 3 via the IC chip IF 28 in a non-contact manner. Further, information (data), which has been stored in the IC chip 3, may be read out therefrom via the IC chip IF 28 in a non-contact manner.

In the IC chip 3 (see FIG. 4), the power supply circuit 326 rectifies an electromagnetic wave signal supplied via the antenna 300 so as to supply electric power to the respective constituent units of the IC chip 3. This electric power is required for these constituent units.

The clock reproducing circuit 320 reproduces a clock signal from the electromagnetic wave signal supplied from the IC chip IF 28 through the antenna 300 to output this reproduced clock signal to the memory circuit 322 and the data transmitting/receiving circuit 324.

The memory circuit 324 is, for example, a nonvolatile RAM (random access memory). This memory circuit 324 stores thereinto data indicative of information, which is input from the data transmitting/receiving circuit 324, in synchronization with the clock signal entered from the clock reproducing circuit 320.

Also, the memory circuit 322 outputs such a data indicative of information stored therein to the data transmitting/receiving circuit 324, in synchronization with the clock signal.

The data transmitting/receiving circuit 324 demodulates data from the electromagnetic wave signal, which is entered from the antenna 300, to output this demodulated data with respect to the memory circuit 322 in synchronization with the clock signal entered from the clock reproducing circuit 320.

Also, the data transmitting/receiving circuit 324 changes a reflection strength of the electromagnetic wave signal supplied from the IC chip IF 28 in accordance with a data value entered from the memory circuit 322, in synchronization with the clock signal.

As described above, the data indicative of the information which has been stored in the memory circuit 322 may be transmitted from the IC chip 3 to the IC chip IF 28 by changing the strength of the reflection signal of the electromagnetic wave signal transmitted from the IC chip IF 28 to the IC chip 3.

In the IC chip IF 28 (FIG. 5), the transmission/reception control circuit 282 controls operations of the respective constituent units of this IC chip IF 28.

Also, this transmission/reception control circuit 282 outputs such data entered from the control apparatus main body 20 (namely, first printing/transmitting program 5; will be discussed later with reference to FIG. 6) to the demodulation circuit 288.

Further, this transmission/reception control circuit 282 outputs data, which the reception circuit 286 receives and the demodulation circuit 288 demodulates, to the control apparatus main body 20.

The modulation circuit 290 modulates a high frequency signal (radio frequency signal) based upon data entered from the transmission/reception control circuit 282 to produce an electromagnetic wave signal, and then, outputs this produced electromagnetic wave signal to the transmission circuit 284.

The transmission circuit 284 transmits the electromagnetic wave signal via the antenna 280 to the IC chip 3, while this electromagnetic wave signal contains data to be stored in the IC chip 3 and the clock signal.

The reception circuit 296 receives a reflection signal, which is reflected from the IC chip 3, and then outputs this received reflection signal to the demodulation circuit 288.

The modulation circuit 288 demodulates the data transmitted from the IC chip 3 based upon a change of the reflection signal entered from the reception circuit 286, and then outputs the demodulated data to the transmission/reception control circuit 282.

[First Printing/Transmitting Program 5]

Figure 6:
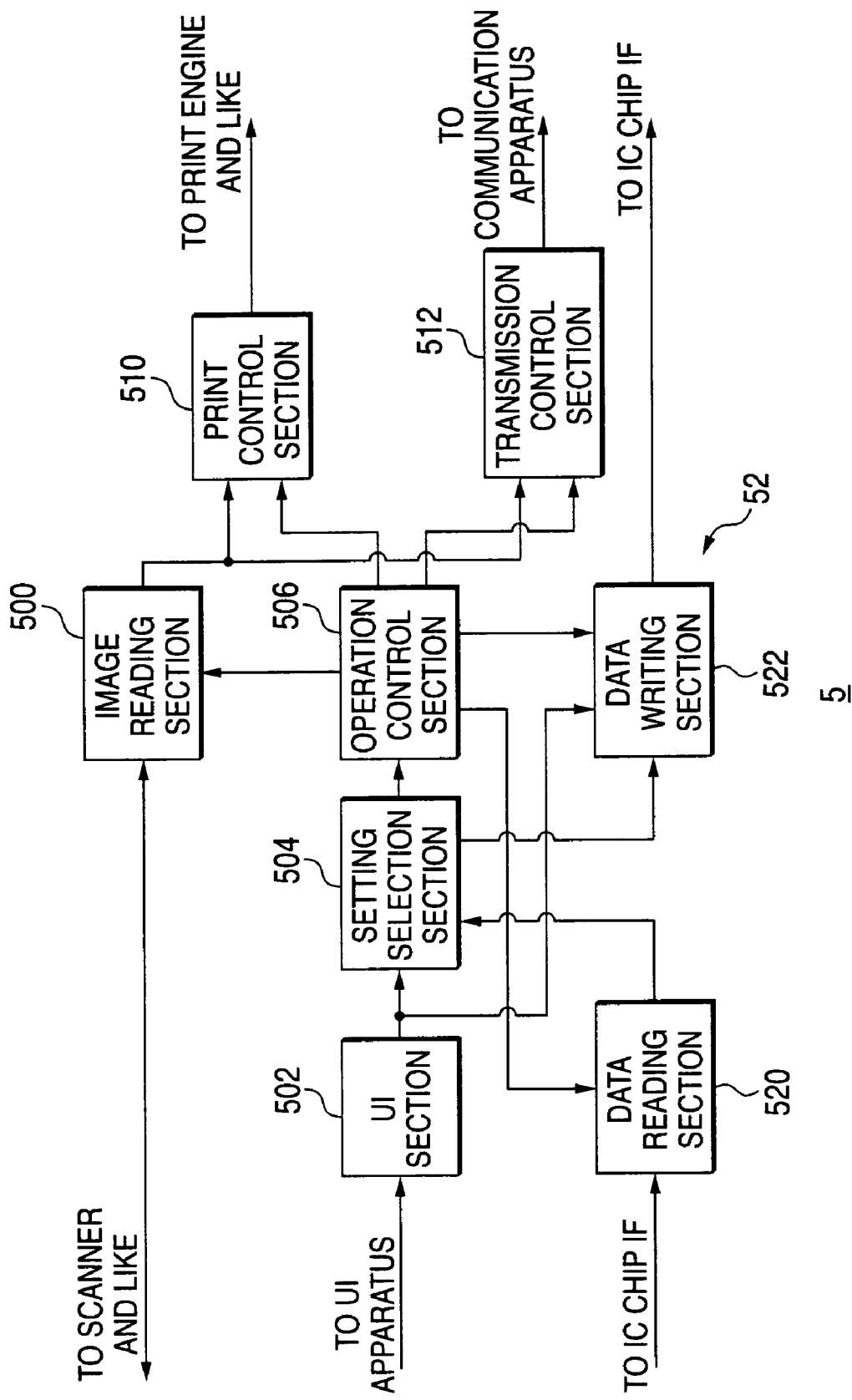
FIG. 6 is a diagram for representing a structure of a first printing/transmitting program which is executed by the control apparatus (FIG. 1 and FIG. 2) so as to realize the image forming method according to the present invention.

FIG. 6 is a block diagram for schematically indicating a constitution of a first printing/transmitting program 5, which is executed by the control apparatus 2 (see FIG. 1 and FIG. 2) so as to realize the image forming method according to the present invention.

As shown in FIG. 6, the first printing/transmitting program 5 includes an image reading section 500, a UI section 502, a setting selection section 504, an operation control section 506, a print control section 510, a transmission control section 512, and an IC chip control section 52.

The IC chip control section 52 includes a data reading section 520 and a data writing section 522.

This first printing/transmitting program 5 is supplied from, for example, a recording medium 240 (see FIG. 1) to the control apparatus 2, and is loaded to the memory 204 so as to be executed.

In the first printing/transmitting program 5, the image reading section 500 controls the constituent units of the apparatus main body 10 such as the original feeding apparatus 18 and the scanner 16 (FIG. 2) in accordance with the control of the operation control section 506 to read an image of the original paper 40 (FIG. 3).

FIG. 7 is a diagram for showing an example of an image, which is printed on a print paper 42 by the first printing/transmitting program 5.

The print control section 510 controls the constituent units of the apparatus main body 10 such as the paper tray section 12 and the print engine of 14 in accordance with the control of the operation control section 506 to print the image of the original paper 40 read by the image reading section 500 on the print paper 42 as shown in FIG. 7.

The transmission control section 512 controls the constituent unit of the apparatus main body 10 such as the communication apparatus 22 (FIG. 1) in accordance with the control of the operation control section 506 to transmit the image of the original paper 40 read by the image reading section 500 in a FAX (facsimile) mode.

The UI section 502 accepts operation by a user with respect to the UI apparatus 26 (FIG. 1 and FIG. 2), and outputs an instruction of a printing method for the composite copying machine 1, and data indicative of setting information, which indicates a FAX transmission destination, to an identifying section 530 (not shown).

The data writing section 522 controls the IC chip IF 28 to write the data indicative of the setting information input from the UI section 502 into the IC chip 3 (see FIG. 3 and FIG. 4).

The data reading section 520 controls the IC chip IF 28 to read such data indicative of the setting information, which has been stored in the IC chip 3 by the data writing section 522 controlling the above-explained IC chip IF 28, to output the read data to the setting selection section 504.

It should also be noted that judgment as to whether or not data transmitted from the IC chip 3 has been read under normal condition may be realized by employing the following judging method. That is, the data writing section 522 stores such a data in the IC chip 3 with adding an error detection code to the data, and when the data reading section 520 reads out this data, it is checked whether or not an error is detected.

In accordance with an instruction clearly made by a user, or a tacitly-made instruction with respect to the UI apparatus 26 (FIG. 1 and FIG. 2), the setting selection section 504 selects any one of the setting information, which is read from the IC chip 3 by the data reading section 520, and the setting information, which is input to the UI apparatus 26 by the user, and then, outputs the selected setting information to the operation control section 506.

As an example of the instructions, which are clearly made by the user, the following operation may be carried out. That is, when a display apparatus of the UI apparatus 26 is equipped with a button used to instruct to read the setting information from the IC chip 3 is employed for the print/FAX transmission purpose, the user depresses this button.

Also, as an example of the instructions, which are tacitly made by the user, the following instruction may be made. That is, when the user depresses a start button disposed in the UI apparatus 26 without instructing neither to use the setting information read from the IC chip 3 or to use the setting information made in the UI apparatus 26 and the setting information can be read from the IC chip 3, the instruction by the user is deemed that the print/FAX transmission is performed in accordance with the setting information read from the IC chip 3. To the contrary, in cases other than the above set forth, the instruction by the user is deemed that the print/FAX transmission is performed in accordance with a default setting of the composite copying machine 1.

The operation control section 506 controls the image reading section 500, the print control section 510, the transmission control section 512, the data writing section 522, in accordance with the setting information entered from the setting selection section 504, to make those sections perform the print operation and/or the FAX operation.

In other words, when the input setting information is setting of performing the printing operation, the operation control section 506 controls the image reading section 500 to read an image, and then, controls the print control section 510 to print out the read image.

Alternatively, when the input setting information is setting of performing the FAX transmitting operation, the operation control section 506 controls the image reading section 500 so as to read an image, and then, controls the transmission control section 512 so as to transmit the read image in the FAX mode.

[Overall Operation]

Next, overall operation of the above-described composite copying machine 1 will be described in which the user issues a clear instruction.

Figure 8:
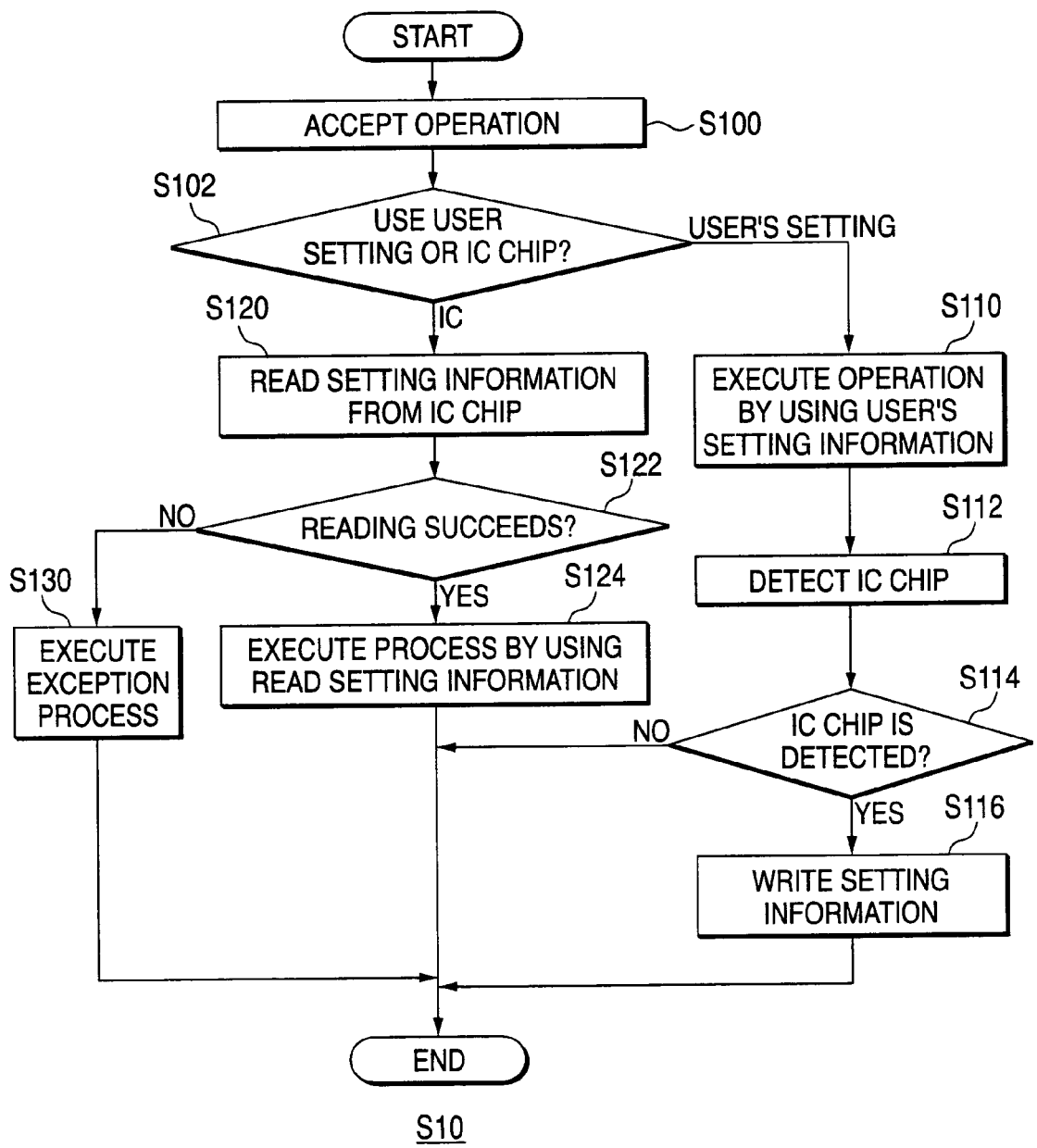
FIG. 8 is a flow chart for describing operations (S10) of the composite copying machine (first printing/transmitting program).

FIG. 8 is a flowchart for describing operation (defined in S10) of the composite copying machine 1 (namely, first printing/transmitting program 5).

As indicated in FIG. 8, in a step 100 (S100), the UI section 502 (FIG. 6) accepts an operation for instructing that either the setting information obtained from the IC chip 3 (FIG. 3) or the setting information input by the user, in order to execute either the printing operation or the FAX transmitting operation.

In a step 102 (S102), the setting selection section 504 judges whether or not the operation by the user, which is accepted at the process of the step S100, is an instruction for using the setting information obtained from the IC chip 3.

When the setting selection section 504 judges that the user instructs using the setting information obtained from the IC chip 3, this first printing/transmitting program 5 is advanced to a process of a step S120.

In other cases, the first printing/transmitting program 5 is advanced to a process defined in a step S110, while the setting condition designated by the operation accepted in the process operation of the step S100 is employed as the setting information.

In the step 110 (S110), the operation control section 506 controls the image reading section 500 and either the printing control unit 510 or the transmission control section 512, if necessary, in order to execute either the printing process operation or the FAX transmitting operation by using the setting information input by the user.

In a step 112 (S112), the operation control section 506 controls the data writing section 522 and the data reading section 520 so as to output an electromagnetic wave signal to the original paper 40, which is transported in the vicinity of the antenna 280 by the original feeding apparatus 18, and then detects a response signal derived from the IC chip 3 to this transmitted electromagnetic wave signal.

In a step 114 (S114), the operation control section 506 judges whether or not the response signal derived from the IC chip 3 attached to the original paper 40 is detected.

When the response signal derived from the IC chip 3 is detected, the first printing/transmitting program 5 is advanced to a process of a step S116. In other cases, the process of this printing/transmitting program 5 is terminated.

In the step 116 (S116), the operation control section 506 controls the data writing section 522 to write a data indicative of the setting information accepted in the process of the step S100 into the IC chip 3.

In a step 120 (S120), the operation control section 506 controls the data reading section 520 to read the setting information stored in the IC chip 3.

In a step 122 (S122), the operation control section 506 judges whether or not reading operation of the setting information from the IC chip 3 succeeds.

When this reading operation succeeds, the first printing/transmitting program 5 is advanced to a process of a step S124. In other cases, the first printing/transmitting program 5 is advanced to a process of a step S130.

In a step 124 (S124), the operation control section 506 controls the image reading section 500 and either the print control section 510 or the transmission control section 512, if necessary, in order that either the printing process operation or the FAX transmission operation is carried out by using the setting information read from the IC chip 3.

In a step 130 (S130), the operation control section 506 executes an exceptional process operation in which such a message that the setting information could not be read out from the IC chip 3 is displayed on the display apparatus of the UI apparatus 26 (FIG. 1).

[Modification]

Figure 9:
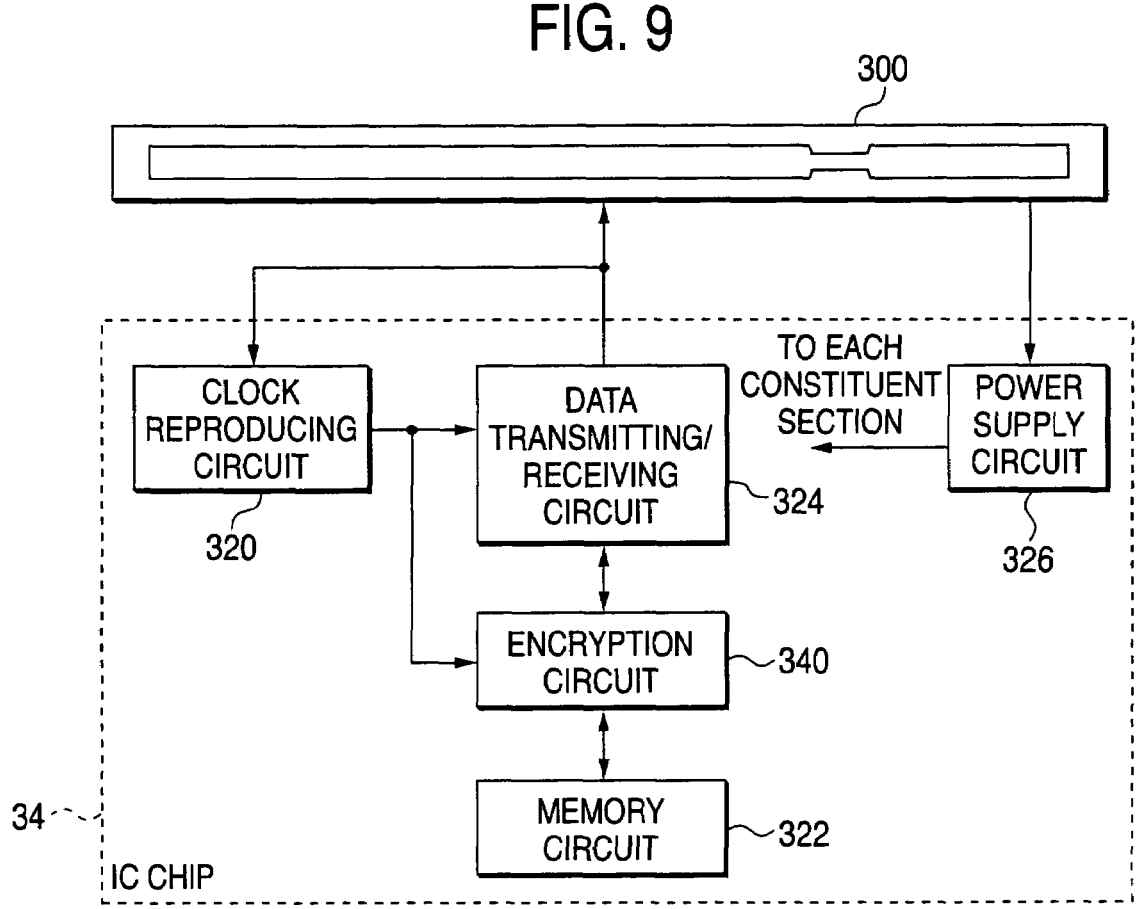
FIG. 9 is a diagram for exemplifying a structure of a second IC chip.

FIG. 9 is a diagram for indicating a constitution of a second IC chip 34 according to another embodiment of the invention in.

Figure 10:
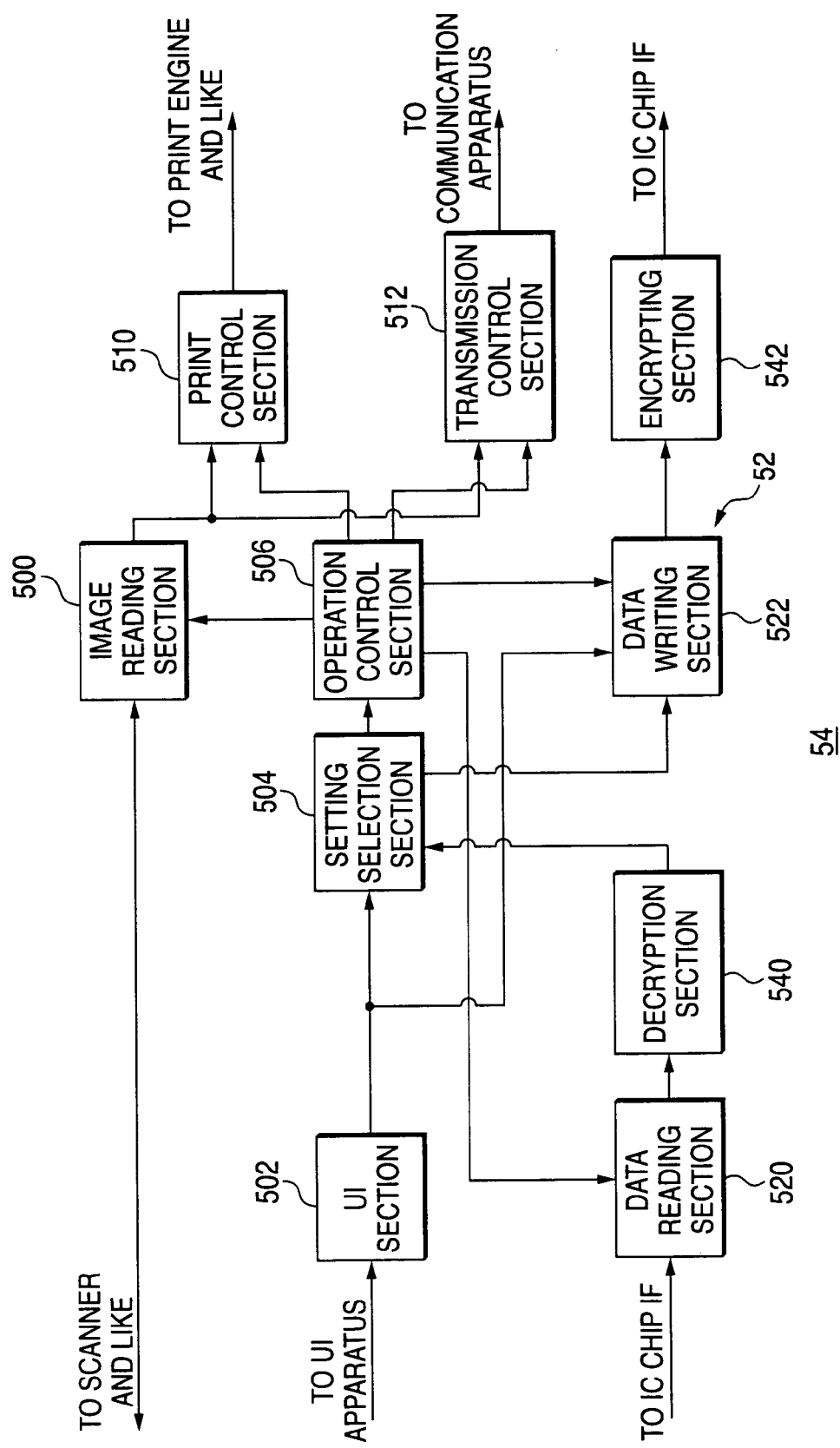
FIG. 10 is a diagram for representing a structure of a second printing/transmitting program.

FIG. 10 is a block diagram for representing a constitution of a second printing/transmitting program 54.

As shown in FIG. 9, the second IC chip 34 employs such a structure that an encryption section 340 is additionally interposed between the memory circuit 322 and the data transmitting/receiving circuit 324 of the first IC chip 3 (see FIG. 4).

As indicated in FIG. 10, the second printing/transmitting program 54 employs such an arrangement that a decryption section 540 is additionally interposed between the data reading section 520 and the setting selection section 504 of the first printing/transmitting program 5, and that an encrypting section 542 is additionally interposed between the data writing section 522 and the IC chip IF 28 (see FIG. 1 and FIG. 5).

It should be understood that the same reference numerals used in the respective constituent components of the IC chip 3 will be employed as those for denoting the essentially same constituent components of this second IC chip 34. Furthermore, the same reference numerals used in the respective constituent components of the first printing/transmitting program 5 will be employed as those for denoting the essentially same constituent components of the second printing/transmitting program 54.

When the IC chip 3 is provided with the encryption section 340 and the second printing/transmitting program 54 is provided with the decryption section 540, in the second IC chip 34, the encryption section 340 reads out such a data indicative of a password and secret information from the memory circuit 322 in synchronization with the clock signal and then, encrypts the this read data to output the encrypted data to the data transmitting/receiving circuit 324.

The decryption section 540 in the second printing/transmitting program 54 decrypts the data, which has been encrypted and output. Thereafter, the decrypted data is processed in the process operation shown in FIG. 8.

Alternatively, when the decryption section 540 and the encryption section 542 are provided with the second printing/transmitting program 54, such a data, which has been encrypted by the encryption section 542, is stored in the IC chip 3, the encryption data stored in the IC chip 3 is read out by the data reading section 520, and this read encryption data is decrypted by the decryption section 540, and thereafter, this decrypted data is processed in the process operation shown in FIG. 8.

As previously described, it is preferable to execute such an operation that while the data is encrypted in the IC chip 34, the encrypted data is decrypted in the second printing/transmitting program 56 in order to improve secrecy of information, as compared with another process operation in which neither the data encryption, nor the data decryption is carried out.

As previously explained in detail, in accordance with the image forming system and the image forming method according to the present invention, the setting information of forming the image can be stored in the original document by utilizing the semiconductor chip from which the data stored therein can be read in the non-contact manner.

In addition, in accordance with the image forming system and the image forming method according to the present invention, the image forming operation can be carried out by employing the setting information of the image formation which has been stored in the original document, as explained above.

What is claimed is:

1. An image forming system comprising:
an image display member on which an image is displayed; and
an image forming apparatus, wherein:
the image display member includes:
an information storage section that stores information, which is written from external thereinto, and that supplies the stored information to the external; and
the image forming apparatus include:
a setting reception section that receives setting information including a transmission setting from the external;
an image reading section that reads the displayed image;
an information writing section that writes the setting information received by the setting reception section into the information storage section;
an information reading section that reads the setting information from the information storage section; and
a first control section that controls a communication device to transmit the displayed image, which is read by the image reading section, in accordance with the setting information read by the information reading section.

2. The image forming system according to claim 1, wherein
the communication device includes a facsimile device,
the transmission setting includes a destination of a facsimile transmission, and
the first control section controls the facsimile device to transmit the displayed image to the destination read by the information reading section.

3. The image forming system according to claim 1, wherein
the information storage section is configured to include the transmission setting and a print setting regarding a printing method,
the image forming system further comprising:
a second control section that controls an image forming device to form the displayed image, which is read by the image reading section, on a recording medium in accordance with a print setting read by the information reading section, and
a third control section that controls the first control section when the setting information includes the transmission setting, and that controls the second control section when the setting information includes the print setting.

4. The image forming system according to claim 1, wherein
the information storage section is included in an IC chip coupled to an antenna, and
the information reading section is configured to read the setting information constituted by an electromagnetic wave signal supplied from the antenna.

5. An image forming apparatus for forming an image displayed on an image display member, which stores information written from an external thereinto and supplies the stored information to the external, the image forming apparatus comprising:
a setting reception section that receives setting information including a transmission setting from the external;
an image reading section that reads the displayed image;
an information writing section that writes the setting information received by the setting reception section into the information storage section;
an information reading section that reads the setting information from the information storage section; and
a first control section that controls a communication device to transmit the displayed image, which is read by the image reading section, in accordance with the setting information read by the information reading section.

6. The image forming apparatus according to claim 5, wherein
the communication device includes a facsimile device,
the transmission setting includes a destination of a facsimile transmission, and
the first control section controls the facsimile device to transmit the displayed image to the destination read by the information reading section.

7. The image forming apparatus according to claim 5, wherein
the information storage section is configured to include the transmission setting and a print setting regarding a printing method,
the image forming apparatus further comprising:
a second control section that controls an image forming device to form the displayed image, which is read by the image reading section, on a recording medium in accordance with the print setting read by the information reading section, and
a third control section that controls the first control section when the setting information includes the transmission setting, and that controls the second control section when the setting information includes the print setting.

8. The image forming apparatus according to claim 5, wherein
the information storage section is included in an IC chip coupled to an antenna, and
the information reading section is configured to read the setting information constituted by an electromagnetic wave signal supplied from the antenna.

9. An image forming method for forming an image displayed on an image display member, which stores information written from an external thereinto and supplies the stored information to the external, the image forming method comprising:
receiving setting information including a transmission setting from the external;
reading the displayed image;
writing the setting information into the image display member;
reading the setting information; and
controlling a communication device to transmit the displayed image, which is read, in accordance with the read setting information.

10. The image forming method according to claim 9, wherein
the communication device includes a facsimile device,
the transmission setting includes a destination of a facsimile transmission, and
the controlling controls the facsimile device to transmit the displayed image to the destination.

11. The image forming method according to claim 9, wherein
the image display member is configured to include the transmission setting and a print setting regarding a printing method,
the image forming method further comprising:
controlling an image forming device to form the displayed image on a recording medium in accordance with the print setting, and
controlling transmission of the displayed image when the setting information includes the transmission setting, and controlling formation of the displayed image on the recording medium when the setting information includes the print setting.

12. The image forming method according to claim 9, wherein the image display member stores information written from an external thereinto in an IC chip coupled to an antenna, and reading, by the image display member, of the setting information constituted by an electromagnetic wave signal supplied from the antenna.

13. A computer-readable medium encoded with a computer program making a computer of an image forming apparatus form an image display on an image display member, which stores information written from external thereinto and supplies the written information to the external, the program making the computer perform a process comprising:

receiving setting information including a transmission setting from the external;

reading the displayed image;

writing the setting information into the image display member;

reading the setting information; and controlling a communication device to transmit the displayed image in accordance with the read setting information.

14. The computer-readable medium according to claim 13, wherein the communication device includes a facsimile device, the transmission setting includes a destination of a facsimile transmission, and the controlling controls the facsimile device to transmit the displayed image to the destination.

15. The computer-readable medium according to claim 13, wherein the image display member is configured to include the transmission setting and a print setting regarding a printing method, the image forming method further comprising:

controlling an image forming device to form the displayed image on a recording medium in accordance with a print setting, and controlling transmission of the displayed image when the setting information includes the transmission setting, and controlling formation of the displayed image on the recording medium when the setting information includes the print setting.

16. The computer-readable medium according to claim 13, wherein the image display member stores information written from an external thereinto in an IC chip coupled to an antenna, and reading, by the image display member, of the setting information constituted by an electromagnetic wave signal supplied from the antenna.

* * * * *